H. Morris,
Converting Motion.
N° 22,445.   Patented Dec. 28, 1858.
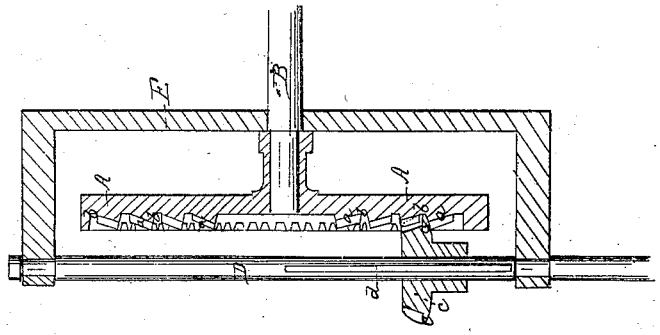
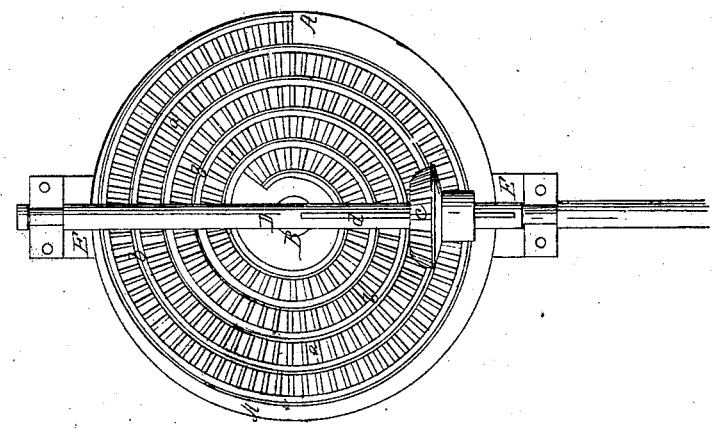

UNITED STATES PATENT OFFICE.

HENRY MORRIS, OF WEST PHILADELPHIA, PENNSYLVANIA.

DEVICE FOR TRANSMITTING ROTARY MOTION.

Specification of Letters Patent No. 22,445, dated December 28, 1858.

*To all whom it may concern:*

Be it known that I, HENRY MORRIS, of West Philadelphia, in the county of Philadelphia and State of Pennsylvania, have invented a new and useful Device for Transmitting Rotary Motion at Gradually Increasing or Diminishing Velocities; and I do hereby declare that the following is a full, clear, and exact description of the same, reference being had to the accompanying drawings, forming part of this specification, in which—

Figure 1 is a front view of my device. Fig. 2 is a central section of the same, at right angles to Fig. 1.

Similar letters of reference denote like parts in both figures.

This invention consists in the combination of two bevel gears, one of which has its teeth arranged in convolute form, and the other of which, gearing with the first one, has its teeth concentric to its axis; the latter being fitted to slide on its shaft that it may, when geared with and driving or being driven by the first one, approach or recede from the axis of the same, under the guidance of a convolute groove which is formed between the convolute coils of teeth, and be thereby caused to receive from or impart to the first one a gradually increasing or diminishing velocity.

The device may be applied to many purposes in machinery, but is more particularly intended to be applied to the spinning mule, the first gear being secured to what is known as the "scroll shaft" of the mule to drive the other one which is attached to a shaft that drives the rollers, for the purpose of producing a gradual diminution of speed of the rollers before stopping them after the mule carriage has moved out a certain distance from the rollers, and thereby prevent the jerk on the yarn which is caused by stopping the rollers suddenly.

To enable others to construct the device, I will proceed to describe it with reference to the drawings.

A, is what I call the convolute gear consisting of a metal disk having a series of bevel faced teeth $a$, $a$, commencing near its center and extending therefrom in a convolute form in several coils toward the outer margin thereof, as shown in Fig. 1. The face of the said disk contains a depression or groove $b$, at the bottoms of said teeth; the said depression or groove following the convolute course of the teeth between the several coils thereof from the commencement to the end thereof. This gear is fast on its shaft B.

C, is what I call the concentric gear which is like an ordinary bevel gear except that its teeth terminate at the ends farthest from the center in a flange $c$, which enters the groove $b$, of the convolute wheel, and that the faces of its teeth are rounded as shown both in Figs. 1 and 2, to accommodate themselves to any variation in the form of the bottoms of the spaces between the teeth of the convolute gear. This gear C, has the bore in its hub grooved to fit to a feather $d$, on its shaft D, and is fitted to slide along the said shaft but prevented turning thereon by the feather and groove.

E, is a frame which contains the necessary bearings for the shaft D, and also one of the bearings for the shaft B of the convolute wheel. This frame may be considered as part of the framing of a machine in which the gears are applied, and keeps the two gears engaged with each other.

Either of the above gears, on having a rotary motion imparted to its shaft by suitable means is caused to impart rotary motion to the other one and its shaft, and the combined rotary motion thus produced causes the flange $c$, to run along the groove $d$, and the concentric gear to approach or recede from the center of the convolute gear according to the direction of their revolutions. The convolute gear, when driving, causes the relative velocity of the concentric gear to diminish as the latter approaches its center and vice versa; and the concentric gear, when driving, causes the relative velocity of the convolute gear to increase as the former approaches the center of the latter, and vice versa.

What I claim as my invention, and desire to secure by Letters-Patent, is:—

The combination of the convolute gear A, and convolute groove ($b$) with a sliding pinion or gear C, substantially as and for the purposes herein shown and described.

HENRY MORRIS.

Witnesses:
B. F. WARREN,
WILLIAM SMITH.